United States Patent
Gao et al.

(10) Patent No.: US 9,143,289 B2
(45) Date of Patent: Sep. 22, 2015

(54) MULTIPLE UPLINK CONTROL CHANNEL TRANSMISSION WITH REDUCED CUBIC METRIC

(75) Inventors: Adele Gao, Beijing (CN); Peng Chen, Beijing (CN); Kari P. Pajukoski, Oulu (FI); Esa T. Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 259 days.

(21) Appl. No.: 12/787,808

(22) Filed: May 26, 2010

(65) Prior Publication Data

US 2010/0303035 A1    Dec. 2, 2010

Related U.S. Application Data

(60) Provisional application No. 61/217,098, filed on May 27, 2009.

(51) Int. Cl.
H04L 5/00      (2006.01)

(52) U.S. Cl.
CPC .............. *H04L 5/0007* (2013.01); *H04L 5/001* (2013.01); *H04L 5/0053* (2013.01); *H04L 5/0055* (2013.01)

(58) Field of Classification Search
CPC ..... H04L 5/0007; H04L 5/001; H04L 5/0053; H04L 5/0055
USPC ......... 370/276, 277, 294, 295, 310, 342, 343, 370/345, 431, 437, 438, 441, 442, 464, 370/465; 455/450, 451, 452.1
See application file for complete search history.

(56) References Cited

U.S. PATENT DOCUMENTS

| | | | |
|---|---|---|---|
| 6,980,540 B1* | 12/2005 | Laroia et al. | 370/345 |
| 2008/0212506 A1* | 9/2008 | Lee et al. | 370/310 |
| 2008/0310547 A1 | 12/2008 | Tiirola et al. | 375/296 |

(Continued)

FOREIGN PATENT DOCUMENTS

| | | |
|---|---|---|
| EP | 2040409 A2 | 3/2009 |
| JP | 2010/536230 A | 11/2010 |

(Continued)

OTHER PUBLICATIONS

3rd Generation Partnership Project; Technical Specification Group Radio Access Network; Requirements for Further Advancements for E-Utra (LTE-Advanced) (Release 8):, 3GPP TR 36.913 V.8.0.0, Jun. 2008, 14 pgs.

(Continued)

*Primary Examiner* — Curtis A Alia
(74) *Attorney, Agent, or Firm* — Harrington & Smith

(57) ABSTRACT

It is determined that there are X uplink control channel resources available for uplink signaling. Each of those X uplink control channel resources are sub-channelized into a plurality of sub-channels that each defines a unique time instant or point in time. For each of Y units of control information there is selected a unique combination of one of the sub-channels and a modulation (X and Y are each integers greater than one). The Y units of control information are sent on the X uplink control channel resources according to the respectively selected combinations. By example the uplink resources may be an ACK/NAK/DTX bit on a PUCCH. In one example the sub-channels are individual slots of a PUCCH. In another example the sub-channels are the reference-signal part and the data part of a single PUCCH slot.

21 Claims, 7 Drawing Sheets

(56) References Cited

U.S. PATENT DOCUMENTS

| | | | |
|---|---|---|---|
| 2009/0221289 A1* | 9/2009 | Xu et al. | 455/435.1 |
| 2009/0245148 A1* | 10/2009 | Mccoy | 370/310 |
| 2009/0279460 A1* | 11/2009 | Sarkar | 370/280 |
| 2009/0279493 A1* | 11/2009 | Gaal et al. | 370/329 |
| 2009/0290549 A1* | 11/2009 | Tiirola et al. | 370/329 |

FOREIGN PATENT DOCUMENTS

| | | | |
|---|---|---|---|
| WO | WO 2009/022833 A2 | 2/2009 | |
| WO | WO 2009/022866 A1 | 2/2009 | |
| WO | WO-2010/060455 A1 | 6/2010 | |
| WO | WO-2010/105680 A1 | 9/2010 | |

OTHER PUBLICATIONS

"Views on TxD schemes for PUCCH", Panasonic, 3GPP TSG RAN WG1 Meeting #56, R1-090690, Feb. 2009, 3 pgs.

"LTE-A transmit diversity schemes for PUCCH format 1/1a/1b", Sharp, 3GPP TSG RAN WG1 Meeting #56, R1-090697, Feb. 2009, 8 pgs.

"Evaluation of transmit diversity for PUCCH in LTE-A", Nortel, 3GPP TSG-RAN WG1 #56, R1-090741, Feb. 2009, 6 pgs.

"PUCCH TxD Schemes for LTE-A", LG Electronics, 3GPP TSG RAN WG1 #56, R1-090786, Feb. 2009, 6 pgs.

"PUCCH Transmit Diversity", Qualcomm Europe, 3GPP TSG-RAN WG1 #56, R1-090870, Feb. 2009, 6 pgs.

"UL control signalling to support bandwidth extension in LTE-Advanced", Nokia Siemens Networks, 3GPP TSG RAN WG1 Meeting #56bis, R1-090234, Jan. 2009, 5 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.6.0, Sep. 2009 , 137 pgs.

3GPP TSG RAN WG1 Meeting #56. R1-090724. UL control signaling to support bandwidth extension in LTE-Advanced. Athens, Greece. Feb. 9-13, 2009.(5 pages).

3GPP TSG RAN WG1 Meeting #53bis. R1-082589. Multi-bits ACK/NACK signaling for LTE TDD. Warsaw, Poland. Jun. 30-Jul. 4, 2008. (5 pages).

3GPP TSG RAN WG1 #53. R1-081730. Increasing PUCCH Multiplexing Capacity. Kansas City, USA. May 5-9, 2008. (3 pages).

3GPP TS 36.213 V8.5.0 (Dec. 2008). Technical Specification Group Radio Access Network; Evolved Universal Terrestrial Radio Access (E-UTRA); Physical layer procedures (Release 8).

3GPP TS 36.211 V8.5.0 (Dec. 2008). ). Technical Specification Group Radio Access Network; Evolved Universal Terrestrial Radio Access (E-UTRA); Physical Channels and Modulation (Release 8).

Huawei; "PUCCH design for carrier aggregation"; 3GPP R1-091810; 3GPP TSG RAN WG1 Meeting #57, May 4-8, 20009; San Francisco, USA; pp. 1-8. URL: http://www.3gpp.org/ftp/tsg__ran/WG1__RL1/TSGR1__57/Docs/R1-083679.zip.

NTT DOCOMO, Inc.; "UL Layered Control Signal Structure in LTE-Advanced"; 3GPP R1-083679; 3GPP TSG RAN WG1 Meeting #54bis, Sep. 29-Oct. 3, 2008; Prague, Czech Republic; pp. 1-14. URL: http://www.3gpp.org/ftp/tsg__ran/WG1__RL1/TSGR1__54b/Docs/R1-083679.zip.

Nokia Siemens Networks et al.; "Increasing the size of CQI by means of enhanced sequence modulation"; 3GPP R1-073000; 3GPP TSG RAN WG1 Meeting #49bis, Jun. 25-29, 2007; Orlando, USA; pp. 1-4. URL: http://www.3gpp.org/ftp/tsg__ran/WG1__RL1/TSGR1__49b/Docs/R1-073000.zip.

Nokia Siemens Networks et al.; "PUCCH sequence modulation sequences"; 3GPP R1-073001; 3GPP TSG RAN WG1 Meeting #49bis, Jun. 25-29, 2007; Orlando, USA; pp. 1-5. URL: http://www.3gpp.org/ftp/tsg__ran/WG1__RL1/TSGR1__49b/Docs/R1-073001.zip.

ZTE; "Uplink Control Channel Design for LTE-Advanced"; 3GPP Draft R1-091702; 3GPP TSG-RAN WG1 #57, May 4-8, 2009; San Francisco, USA; pp. 1-6, paragraphs [01.], [2.], [2.1], [2.2]; 3GPP,Sophia-Antipolis Cedex, France.

Samsung; "UL ACK/NAK Transmission in LTE-A"; 3GPP Draft R1-091877; 3GPP TSG RAN WG1 #57, May 4-8, 2009; San Francisco, USA; pp. 1-4, paragraphs 2, 2.1, c), e); 3GPP,Sophia-Antipolis Cedex, France.

Nokia Siemens Networks et al.; "Increasing the size of CQI by means of enhanced sequence modulation" ; 3GPP R1-073000; 3GPP TSG RAN WG1 Meeting #49bis, Jun. 25-29, 2007; Orlando, USA; pp. 1-4. URL: http://www.3gpp.org/ftp/tsg__ran/WG1__RL1/TSGR1__49b/Docs/R1-073000.zip.

Nokia Siemens Networks et al.; "PUCCH sequence modulation sequences"; 3GPP R1-073001; 3GPP TSG RAN WG1 Meeting #49bis, Jun. 25-29, 2007; Orlando, USA; pp. 1-5. URL: http://www.3gpp.org/ftp/tsg__ran/WG1__RL1/TSGR1__49b/Dos/R1-073001.zip.

* cited by examiner

Fig. 1: Prior Art

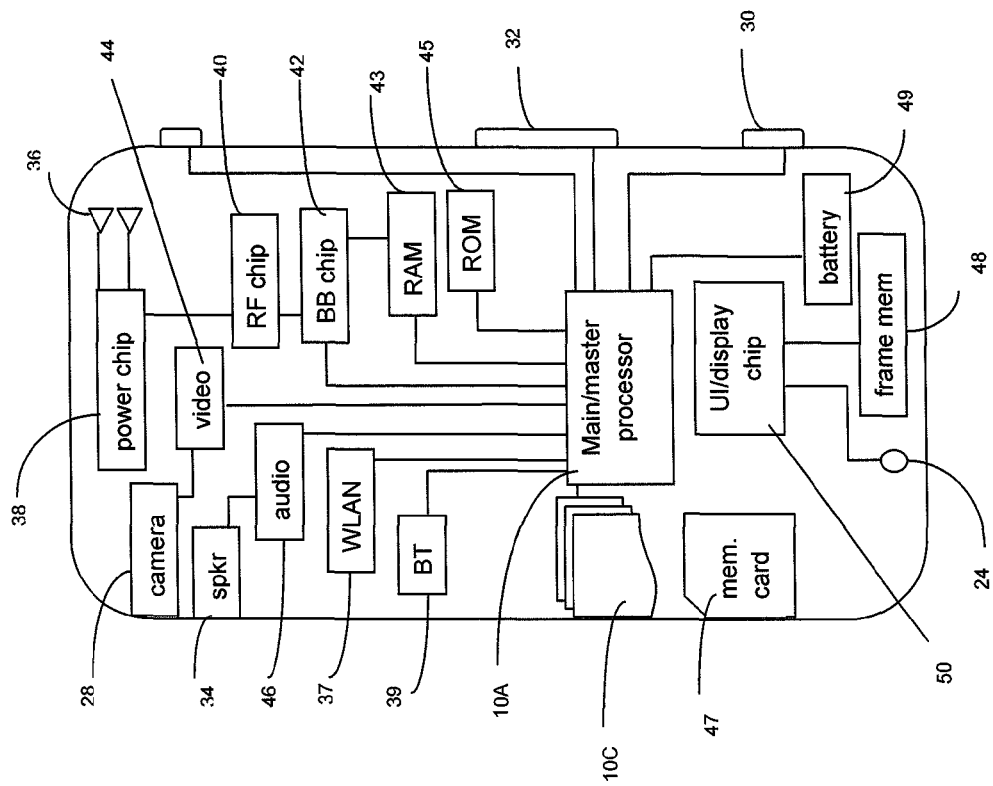
Fig. 3B
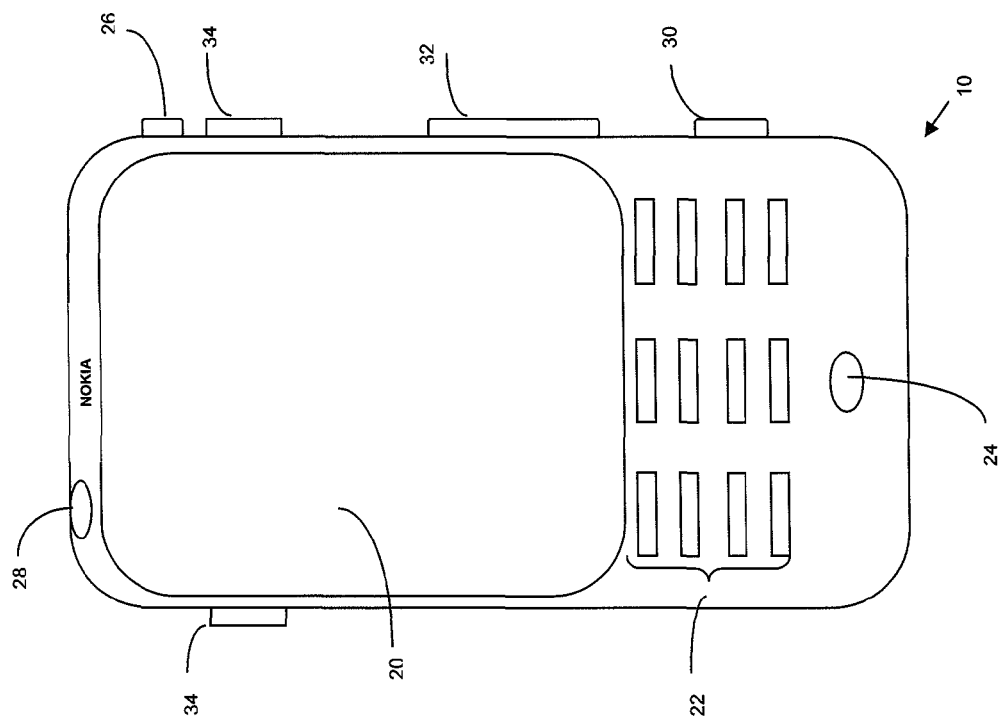

Data part (Slot #0)

| Cyclic shift | Orthogonal cover code 0 | 1 | 2 | unused 4 |
|---|---|---|---|---|
| 0 | 0 |  | 12 |  |
| 1 |  | 6 |  |  |
| 2 | 1 |  | 13 |  |
| 3 |  | 7 |  |  |
| 4 | 2 |  | 14 |  |
| 5 |  | 8 |  |  |
| 6 | 3 |  | 15 |  |
| 7 |  | 9 |  |  |
| 8 | 4 |  | 16 |  |
| 9 |  | 10 |  |  |
| 10 | 5 |  | 17 |  |
| 11 |  | 11 |  |  |

RS part (Slot #0)

| Cyclic shift | Orthogonal cover code 0 | 1 | 2 |
|---|---|---|---|
| 0 | 0 |  | 12 |
| 1 |  | 6 |  |
| 2 | 1 |  | 13 |
| 3 |  | 7 |  |
| 4 | 2 |  | 14 |
| 5 |  | 8 |  |
| 6 | 3 |  | 15 |
| 7 |  | 9 |  |
| 8 | 4 |  | 16 |
| 9 |  | 10 |  |
| 10 | 5 |  | 17 |
| 11 |  | 11 |  |

| bit sequence | Resource number Data, RS |
|---|---|
| 00 | 0,0 |
| 01 | 0,8 |
| 10 | 8,0 |
| 11 | 8,8 |

Fig. 4A: Data/RS-based ORT

Slot #0 (Data/RS)

| Cyclic shift | Orthogonal cover code 0 | 1 | 2 |
|---|---|---|---|
| 0 | 0 |  | 12 |
| 1 |  | 6 |  |
| 2 | 1 |  | 13 |
| 3 |  | 7 |  |
| 4 | 2 |  | 14 |
| 5 |  | 8 |  |
| 6 | 3 |  | 15 |
| 7 |  | 9 |  |
| 8 | 4 |  | 16 |
| 9 |  | 10 |  |
| 10 | 5 |  | 17 |
| 11 |  | 11 |  |

Slot #1 (Data/RS)

| Cyclic shift | Orthogonal cover code 0 | 1 | 2 |
|---|---|---|---|
| 0 | 0 |  | 12 |
| 1 |  | 6 |  |
| 2 | 1 |  | 13 |
| 3 |  | 7 |  |
| 4 | 2 |  | 14 |
| 5 |  | 8 |  |
| 6 | 3 |  | 15 |
| 7 |  | 9 |  |
| 8 | 4 |  | 16 |
| 9 |  | 10 |  |
| 10 | 5 |  | 17 |
| 11 |  | 11 |  |

| bit sequence | Resource number Slot #0, Slot #1 |
|---|---|
| 00 | 0,0 |
| 01 | 0,8 |
| 10 | 8,0 |
| 11 | 8,8 |

Fig. 4B: Slot-based ORT

MULTIPLE UPLINK CONTROL CHANNEL TRANSMISSION WITH REDUCED CUBIC METRIC

PRIORITY CLAIM

This application claims priority under 35 USC §119(e) to provisional U.S. Patent Application No. 61/217,098 (filed May 27, 2009) which is hereby incorporated by reference in its entirety.

TECHNICAL FIELD

The exemplary and non-limiting embodiments of this invention relate generally to wireless communication systems, methods, devices and computer programs and, more specifically, relate to control signaling in wireless communication systems.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
ACK acknowledge
CC component carrier
CCE control channel element
CM cubic metric
DL downlink (eNB towards UE)
DTX discontinuous transmission
eNB EUTRAN Node B (evolved Node B)
FDD frequency division duplexing
EUTRAN evolved UTRAN (LTE, sometimes termed 3.9G)
CQI channel quality indicator
FDD frequency division duplex
FDMA frequency division multiple access
FDPS frequency domain packet scheduler
HARQ hybrid automatic repeat request
HO handover
LB long block
LTE long term evolution
NAK/NACK not acknowledge or negative acknowledge
Node B base station
PRB physical resource block
PDCCH physical downlink control channel
PDSCH physical downlink shared channel
PUCCH physical uplink control channel
RS reference signal
SC-FDMA single carrier, frequency division multiple access
SU-MIMO single user multiple-input multiple-output
TDD time division duplex
UE user equipment
UL uplink (UE towards eNB)
UTRAN universal terrestrial radio access network A communication system known as evolved UTRAN (EUTRAN, also referred to as UTRAN-LTE or as E-UTRA) is currently under development within the 3GPP. As presently specified the DL access technique will be orthogonal frequency division multiple access (OFDMA), and the UL access technique will be SC-FDMA.

One specification of interest is 3GPP TS 36.300, V8.6.0 (2008 September), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein in its entirety.

FIG. 1 reproduces FIG. 4.1 of 3GPP TS 36.300, and shows the overall architecture of the E-UTRAN system. The EUTRAN system includes eNBs, providing the EUTRA user plane (packet data convergence protocol PDCP/radio link control RLC/medium access control MAC/physical PHY) and control plane (radio resource control RRC) protocol terminations towards the user equipment UE. The eNBs are interconnected with each other by means of an X2 interface. The eNBs are also connected by means of an S1 interface to an evolved packet core (EPC), more specifically to a MME (Mobility Management Entity) by means of a S1 MME interface and to a Serving Gateway (S-GW) by means of a S1 interface. The S1 interface supports a many to many relationship between MMEs/S-GWs and eNBs.

While not a limiting environment for these teachings, of particular interest herein is the 3GPP LTE Release 9 (and beyond towards future International Mobile Telecommunications IMT-A systems, such as for example LTE Release 10), referred to herein for convenience simply as Rel-9, or as LTE-Advanced (LTE-A, sometimes termed 4.0G). The current LTE system is Release 8 or Rel-8. Of additional interest herein are deployment scenarios using TDD or FDD mode in a scalable bandwidth manner (of up to, for example, 100 MHz) with a component carrier (CC) aggregation technique. This is shown at FIG. 2, in which there are five adjacent carriers of 20 MHz each to span a LTE-A bandwidth of 100 MHz. FIG. 2 shows some carriers (4 and 5) are compatible with Rel. 8 and therefore accessible by Rel-8 terminals/UEs, while other carriers (1 through 3) are Rel-9 carriers and incompatible with terminals/UEs which operate only under Rel-8 but not Rel-9. Other deployments may find all five carriers Rel-8 compatible, and Release 10 may have a different arrangement of component carrier compatibility. Whether 20 MHz wide or otherwise, each of these adjacent carriers are termed component carriers (CC).

It has been decided that LTE Rel-8 UEs should be able to operate in the LTE-A system. In evolving towards Rel-9, maintaining backwards compatibility with Rel-8 (E-UTRAN) is an important issue. For example, a Rel-8 UE should be able to access a corresponding Rel-9 system, and a Rel-9 UE should be able to access corresponding Rel-8 system, as shown by the arrangement of FIG. 2. Provided that a Rel-8 UE is capable of operating in a scalable system bandwidth of up to 20 MHz (e.g., 10 MHz TDD or 20 MHz TDD) as specified in 3GPP, and that this bandwidth is then scaled up to 100 MHz for Rel-9, the Rel-9 radio system may possibly be structured as a scalable multi-carrier system having at least one Rel-8-compatible carrier.

As can be appreciated, a number of problems can arise in attempting to maintain compatibility between Rel-8 and Rel-9 systems, such as in the uplink control channel design and optimization of that control channel. One requirement of the LTE-A fourth generation (4G) communication network as specified by the International Telecommunications Union (ITU) is the capability for single user multiple-input/multiple-output (SU-MIMO) transmissions, with up to four transmission antennas supported by the LTE-Advanced uplink system.

In Rel-8, the UE transmits control signals to the eNB on a physical uplink control channel (PUCCH). These control signals include ACK/NAK, channel quality indicators (CQI), and scheduling request (SR) indicators. The PUCCH concept of Rel-8 is being extended to LTE-A. To adapt the PUCCH for LTE-A, certain contributors to the 3GPP discussions have suggested that single-carrier transmission should be the target (or at least one option) whenever possible. This is a challenge especially from ACK/NAK signaling point of view because of the CC-specific HARQ and transport block; there will be multiple ACK/NAK bits per UL subframe.

For example, in document R1-090724 (3GPP TSG RAN WG1 Meeting #56, Athens, Greece; 09-13 Feb. 2009; by Nokia Siemens Networks and Nokia, attached to the priority document as Exhibit A), single-carrier properties are maintained by applying Rel-8 TDD principles when signaling multiple ACK/NAK bits per UL subframe. In LTE Rel-8 TDD, in the case of asymmetric DL/UL configuration, the UE has the possibility to report ACK/NAK associated with multiple DL subframes during one UL subframe. The ACK/NAK signaling for multiple DL subframes can be made using either ACK/NAK bundling or an ACK/NAK multiplexing mode.

For the ACK/NAK bundling mode, an AND operation is first performed on the ACK/NAK bits in the time domain to get one bundled ACK/NAK bit (or 2 bits with multi code-word MCW DL transmission), then the bundled bit is modulated and transmitted on the PUCCH channel corresponding to the last detected DL grant.

For the ACK/NAK multiplexing mode, channel selection is used which enables transmission of 2-4 bits via a single PUCCH channel selected from up to 4 PUCCH channels. The selected channel and the used QPSK constellation point are determined based on the ACK/NAK/DTX states for the multiple DL subframes as shown in Table 10.1-2, 10.1-3, and 10.1-4 of 3GPP TS36.213 v850 (attached to the priority document as Exhibit B).

However, as mentioned above it can only support up to 4 ACK/NAK bits via channel selection among 4 existing PUCCH channels. In the case when the Rel-8 TDD solution is applied with two PUCCH Format 1b resources, it can support up to 3 ACK/NAK bits per subframe via channel selection.

Another proposal is at PCT/EP2009/053214, which relates to Improved ACK/NAK Transmission Method in LTE-Advanced, and which can support up to 6 ACK/NAK bits while at the same time avoid the coverage problem. However, this is achieved by using multiple transmission antennas and so is not useful for UEs having only one transmit antenna as many of the Rel-8 UEs would, and likely some early Rel-9 UEs also.

Also relevant to these teachings is US Patent Publication 2008/0310547 A1 (published Dec. 12, 2008) and entitled "Multi-Code Precoding for Sequence Modulation". In at least some embodiments, the multi-code precoding detailed there imposes certain requirements for the occupied PUCCH channels, i.e., that they should have the same or adjacent cyclic shift, in order to achieve the cubic metric benefit. These requirements are similar to those in document R1-082589 ((3GPP TSG RAN WG1 Meeting #53bis, Warsaw, Poland; Jun. 30-Jul. 4, 2008; by Nokia and Nokia Siemens Networks, attached to the priority document as Exhibit C).

As further background of the PUCCH in Rel-8, there are currently defined seven SC-FDMA symbols (sometimes termed long blocks or LBs) per slot in the PUCCH structure. A sub-frame consists of two slots. One PUCCH channel occupies two consecutive slots (i.e., one sub-frame) with frequency hopping. Part of those LBs are used for reference signals (the RS part, computer searched zero-autocorrelation codes ZAC sequences in Rel-8) for coherent demodulation. The remaining LBs are used for control and/or data transmission (the data part). In LTE Rel-8, one physical resource block PRB consists of 12 subcarriers during seven symbols, and one PRB contains a data part plus a RS part. Two types of code division multiplexing are used on the PUCCH Format 1/1a/b channel both for the data part and the pilot part: cyclic shifts and cover codes. Cyclic shift multiplexing provides nearly complete orthogonality between different cyclic shifts (if the length of cyclic shift is larger than the delay spread of the radio channel). Rel-8 provides up to 12 orthogonal cyclic shifts within one LB. Orthogonal cover codes (e.g., Walsh or discrete Fourier transform DFT spreading) may be used separately for those LBs corresponding to the RS part and those LBs corresponding to the data part. The CQI (PUCCH Format 2/2a/2b) is typically transmitted in Rel-8 without orthogonal covering.

What is needed in the art is an improved way to signal uplink control signals such as ACK/NAK for the case where the UE occupies multiple UL control channel resources (e.g., 2 or more resources) per subframe.

SUMMARY

In a first aspect thereof the exemplary embodiments of this invention provide an apparatus comprising at least one processor, and at least one memory storing computer program instructions. In this first aspect the at least one memory, with the computer program instructions, is configured with the at least one processor to cause the apparatus at least to: determine that there are X uplink control channel resources available for uplink signaling; sub-channelize each of the X uplink control channel resources into a plurality of sub-channels that each defines a unique time instant; select for each of Y units of control information a unique combination of one of the sub-channels and a modulation, in which X and Y are each integers greater than one; and send the Y units of control information on the X uplink control channel resources according to the respectively selected combinations In a second aspect thereof the exemplary embodiments of this invention provide a method comprising: determining that there are X uplink control channel resources available for uplink signaling; sub-channelizing each of the X uplink control channel resources into a plurality of sub-channels that each defines a unique time instant; selecting for each of Y units of control information a unique combination of one of the sub-channels and a modulation, in which X and Y are each integers greater than one; and sending the Y units of control information on the X uplink control channel resources according to the respectively selected combinations.

In a third aspect thereof the exemplary embodiments of this invention provide a computer readable memory storing computer program instructions. In this third aspect, when executed by at least one processor the stored computer programs instructions result in actions comprising: determining that there are X uplink control channel resources available for uplink signaling; sub-channelizing each of the X uplink control channel resources into a plurality of sub-channels that each defines a unique time instant; selecting for each of Y units of control information a unique combination of one of the sub-channels and a modulation, in which X and Y are each integers greater than one; and sending the Y units of control information on the X uplink control channel resources according to the respectively selected combinations.

These and other aspects of the exemplary embodiments of the invention are detailed more particularly below.

BRIEF DESCRIPTION OF THE DRAWINGS

FIG. 3B shows a more particularized block diagram of a user equipment such as that shown at FIG. 3A.

FIG. 4A is a tabular illustration of the Data/Reference Signal-based sub-channelization according to an exemplary embodiment of the invention.

FIG. 4B is similar to FIG. 4A but illustrating a slot-based sub-channelization according to an exemplary embodiment of the invention.

DETAILED DESCRIPTION

Figure 1:
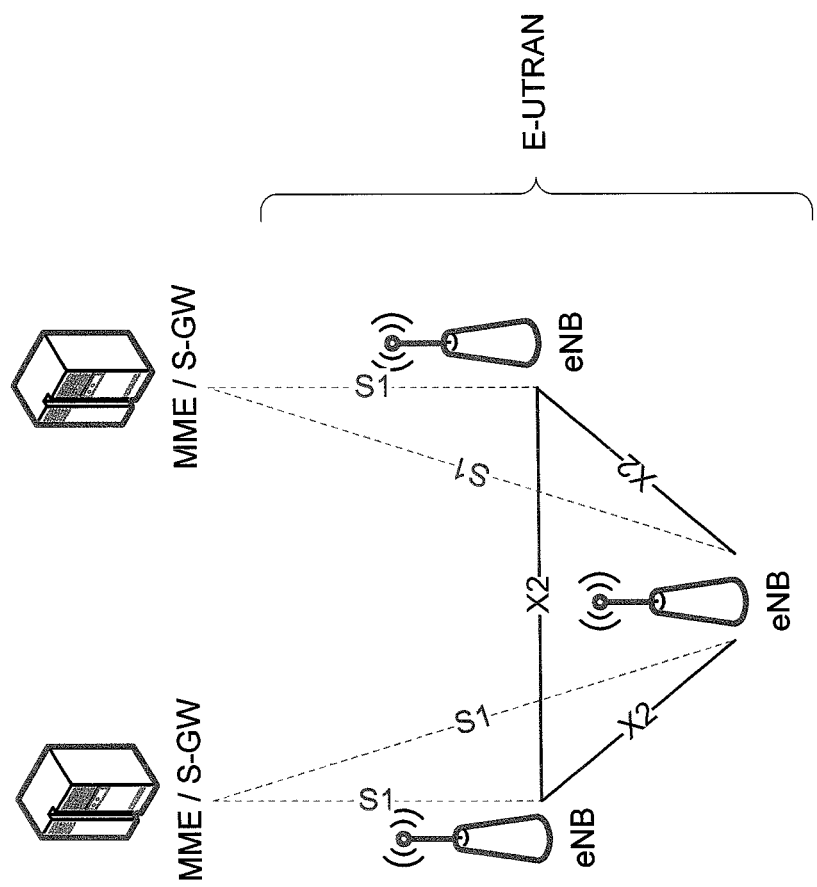
FIG. 1 reproduces FIG. 4 of 3GPP TS 36.300, and shows the overall architecture of the E-UTRAN system.

To improve the UL ACK/NAK payload for the case where the UE occupies two (or more) PUCCH resources per subframe, the inventors considered that a valuable solution would preferably have a low cubic metric, would be backward compatible by re-using the channelization structure of Rel-8, and would support at least four bits per subframe so as to satisfy a total of 16 ACK.NAK/DTX states (see for example section 10 of 3GPP TS 36.213, v8.5.0, cited above for different ACK/NAK/DTX states). A PUCCH resource may be considered to be defined by a combination of cyclic shift and cover code. The exemplary control signaling scheme detailed below is capable of increasing the payload/performance on the PUCCH in any of the formats 1a/1b as compared to current payload/performance on the existing PUCCH for those same formats in Rel-8.

Discontinuous transmission DTX and cubic metric CM are terms well known in the art; DTX in the context of uplink control signaling of ACK/NAK bits concerns pre-defined codewords of a physical downlink shared channel PDSCH. Where it appears that a DL resource allocation transmitted on the PDCCH has failed, the UE has no reason to transmit ACK/NAK in the UL. This is the DTX from the ACK/NAK signaling point of view. CM is the metric of the actual reduction in power capability, or power de-rating, of a typical power amplifier in a mobile handset/UE. It is seen as a more effective metric than peak-to-average power ratio (PAR) which was commonly used in the recent past.

Exemplary embodiments of the invention begin from the assumption that there are two or more PUCCH resources (Format 1a/1b) from the whole PUCCH resource set are available to an individual UE. As noted in background above and consistent with Rel-8, each of these two PUCCH resources may be applied to a Reference Signal (RS) part or a Data part. According to an exemplary embodiment of these teachings, each of those two PUCCH resources may be applied on two sub-channels.

Below are detailed two exemplary ways to do this sub-channelization: in one example the sub-channelization is based on selecting a PUCCH resource on the existing data/RS division in format 1a/1b (shown at FIG. 4A); in another example the sub-channelization is based on selecting PUCCH resource on each slot (shown at FIG. 4B). While these two examples are detailed with particularity below, they do not represent the extent of all sub-channelization techniques; others may be employed consistent with the broader teachings herein, particularly for use outside of LTE Rel-8 and Rel-9. The sub-channels are formed in such a way that only one of the available sub-channels (e.g., the data block or the RS block for the FIG. 4A option; or the resource within a slot for the FIG. 4B option) is selected for transmission during a given time instant or point in time. Therefore, there is an inherent time-division multiplexing between the sub-channels, in either option. The control information (the individual bits for an individual ACK/NAK, for example) is carried as a combination of sub-channel resource selection and modulation.

Figure 3A:
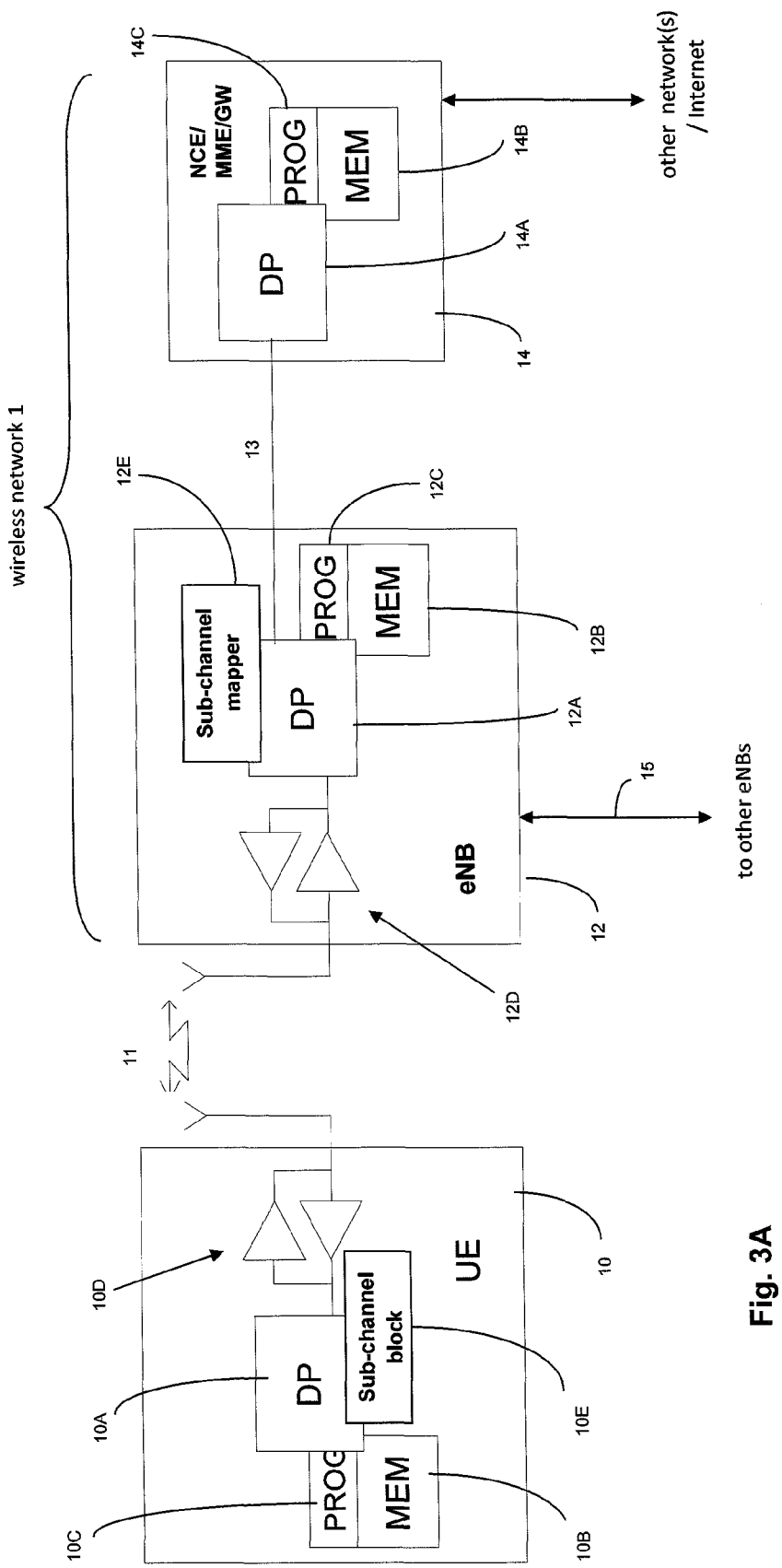
FIG. 3A shows a simplified block diagram of various electronic devices that are suitable for use in practicing the exemplary embodiments of this invention.

Before describing below in particular detail the exemplary embodiments of this invention, reference is made to FIG. 3A for illustrating a simplified block diagram of various electronic devices and apparatus that are suitable for use in practicing the exemplary embodiments of this invention. In FIG. 3A a wireless network 1 is adapted for communication over a wireless link 11 with an apparatus, such as a mobile communication device or terminal which may be referred to as a UE 10, via a network access node, such as a Node B (base station), and more specifically an eNB 12. It is the wireless link 11 from the UE 10 to the eNB 12 in which the PUCCH lies. The data or signaling which the UE 10 ACKs/NAKs on that PUCCH is sent (or is expected by the UE) on the downlink side of that wireless link 11. The network 1 may include a network control element (NCE) 14 that may include the MME/S-GW functionality shown in FIG. 1, and which provides connectivity with a network 1, such as a telephone network and/or a data communications network (e.g., the internet).

The UE 10 includes a controller, such as a computer or a digital data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. One antenna is shown at FIG. 3A, but it is understood other embodiments may have multiple transmit antennas as shown at FIG. 3B. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas (one shown at FIG. 3A; typically the eNB 12 will have an antenna array). The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a sub-channelization block 10E, and the eNB 12 may include a sub-channelization mapper 12E. These may be implemented in the respective DPs 10A, 12A, or in other hardware or software within the respective devices 10, 12. In principle, the sub-channelization block 10E enables the UE 10 to sub-channelize the PUCCHs and determine the modulations as detailed herein and to place the appropriate ACK/NAK on respective unique combinations of sub-channel and modulation for transmission over the PUCCH, and the sub-channelization mapper 12E enables the eNB 12 to decode the ACKs/NAK bits received on the PUCCH by using the sub-channelization and modulation combination that is defined by the ACK/NAK bits.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

FIG. 3B illustrates further detail of an exemplary UE in both plan view (left) and sectional view (right), and the invention may be embodied in one or some combination of those more function-specific components. At FIG. 3B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 3B are seen multiple transmit/receive antennas 36 that are typically used for cellular communication. In some embodiments the UE 10 may have four (or even more) transmit antennas 36, while in other embodiments the UE 10 may have only one transmit antenna 36; in either case the different UEs can use the same sub-channelization procedures detailed herein as sub-channelization is not necessarily tied to MIMO transmission path. The antennas 36 may optionally be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments there is a removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Exemplary embodiments of this invention as to the sub-channelization and modulation may be implemented in the baseband chip 42, though it is noted that other embodiments need not be disposed there but may be disposed across various chips and memories as shown or disposed within another processor that combines some of the functions described above for FIG. 3B. Any or all of these various processors of FIG. 3B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 3B.

Note that the various chips (e.g., 38, 40, 42, etc.) that were described above may be combined into a fewer number than described and, in a most compact case, may all be embodied physically within a single chip.

Now the exemplary embodiments of the invention are detailed with particularity. As was noted above, the UE 10 has two or more PUCCH resources (format 1a/1b) that are available to it from the overall set of PUCCH resources. There are various ways to make the PUCCH resources available, and how they are made available to the UE is not controlling as to how the UE performs the sub-channelization procedure. By example only, there may be ACK/NAK resource provisioning for SU-MIMO; two PUCCH resources may correspond to different control channel elements CCEs of one DL resource grant; one PUCCH channel may be derived based on the lowest CCE of the corresponding DL grant while the second PUCCH channel can be determined based on a logical offset value with respect to the first PUCCH channel (e.g., where the offset value can be defined in a dynamic or in a semi-static way); or both PUCCH channels can be derived based on the channel selection.

However these PUCCHs are made available, this may be generically stated as determining that there are X uplink control channel (PUCCH) resources available for uplink signaling, where the control channel resources are the PUCCHs (format 1a/1b) in these examples, the uplink signaling is ACK and/or NAK signaling, and where X is an integer greater than one. It is understood that the X PUCCH resources are available simultaneously. They are available to the UE and the eNB is expecting signaling from that UE on those PUCCHs.

However these two PUCCH resources are made available to the UE, recall that a PUCCH channel has a RS part and a data part, and occupies two slots. The UE's sub-channelization disperses each of the two PUCCH resources into the two sub-channels. These may be termed the occupied PUCCHs, since they will be occupied with the ACK/NAK bits when the UE sends those PUCCHs. Said generally, the UE sub-channelizes each of the X uplink control channel resources into a plurality of sub-channels that each defines a unique time instant.

In one exemplary aspect, the sub-channelization is based on selecting one of the X available PUCCH resources on one certain data or reference signal part. This is termed herein as Data/RS-based orthogonal resource transmission diversity (ORT). It is an intra-slot sub-channelization since the X resources are present in one slot, and is shown at FIG. 4A which proceeds from the initial condition that X=2 occupied PUCCH Format 1a/1b resources. In this illustration as with FIG. 4B, the two available PUCCH resources are resource indices #0 and #8, and they are located under the same physical resource block PRB. It should be noted that this is not a mandatory requirement in the case of slot-based ORT, i.e., two PUCCH resources can be located also on different PRBs. Note that there are two sub-channels at FIG. 4A. Sub-channel 0 is defined as the data part and sub-channel 1 is defined as the RS part. In one exemplary embodiment, the bit sequence "00" is conveyed via applying resource #0 to sub-channel 0 and applying resource #0 to sub-channel 1. Similar holds true for other bit sequences.

Continuing with the FIG. 4A case of Data/RS-based ORT transmission, a more balanced power per occupied PUCCH channel can be achieved if the selected PUCCH resources are swapped between the data block and RS block at the slot boundary. So for example, the bit sequence "01" can be transmitted in slot #0 as (Data ("8"), RS ("0")); and then at slot #1 as (Data ("0"), RS ("8")).

In another exemplary aspect shown at FIG. 4B, the sub-channelization is based on selecting one of the X available PUCCH resources on one certain slot within the subframe. This is termed herein as slot-based ORT, or inter-slot ORT since the sub-channelization is among the different slots. In the FIG. 4B illustration of this sub-channelization technique, we again use PUCCH resource indices #0 and #8 of the same PRB and X=2 available resources. But in this case, sub-channel 0 is defined as slot 0 of the subframe and sub-channel 1 is defined as slot 1 of the subframe. The different slots 0 and 1 of the PUCCH of course occur at different time instants. As is illustrated at FIG. 4B, the bit sequence "00" is conveyed via applying resource #0 to sub-channel 0 and applying resource #0 to sub-channel 1. Similar holds true for other bit sequences.

The tables in FIGS. 4A-4B are identical but can easily be changed in any specific implementation so long as the UE 10 and eNB 12 both know in advance the mapping between bit sequence and resource index number. The bit sequences 00, 01, 10, and 11 each map to a unique combination of the available PUCCH resources.

Based on the two available PUCCH resources, resource selection for each sub-channel could be used to convey up to two ACK/NAK bits (though of course one bit mapping is also an option depending on the mapping of bit sequences and resources within the sub-channels, so for example bit "0" can correspond to resource number "0,0" and bit "1" can correspond to resource number "8,8"). In addition, 1 or 2 ACK/NAK bit(s) could be conveyed via BPSK or QPSK modulation.

In this manner, for both the RS/Data-based (intra-slot) ORT and the slot-based (inter-slot) ORT sub-channelization aspects detailed above, the UE is enabled to transmit up to four bits using only two available PUCCH resources, i.e., up to two bits by means of sub-channel selection and (one or) two additional bits using a known PUCCH symbol modulation technique via the selected sub-channel.

Having detailed specific exemplary embodiments of the invention, now are detailed some use-cases for specific implementations as to how these embodiments might be exploited in practice. These also are exemplary and not limiting to the broader teachings herein.

In a first use case, the payload on the PUCCH Format 1a/1b is increased, with cubic metric corresponding to a single code transmission. A reference case for comparison would be concurrent transmission via two PUCCH Format 1b channels (multi-code). Implementations according to these teachings improve over the above comparison reference case in that the cubic metric increment which is caused in the reference case by its multi-code transmissions, can be avoided in an implementation according to the above exemplary embodiments of this invention due to the design of the sub-channels. Additionally, the reference case suffers from the power split between the parallel code channels; and further for the implementation according to these teachings the increased payload can be used not only for ACK/NAK signaling but also other control signals such as a scheduling request. For example, in the case of scheduling requests, the two resources can be PUCCH Format 1 and PUCCH Format 1a/1b, instead of two PUCCH Format 1a/1b resources.

Figure 2:
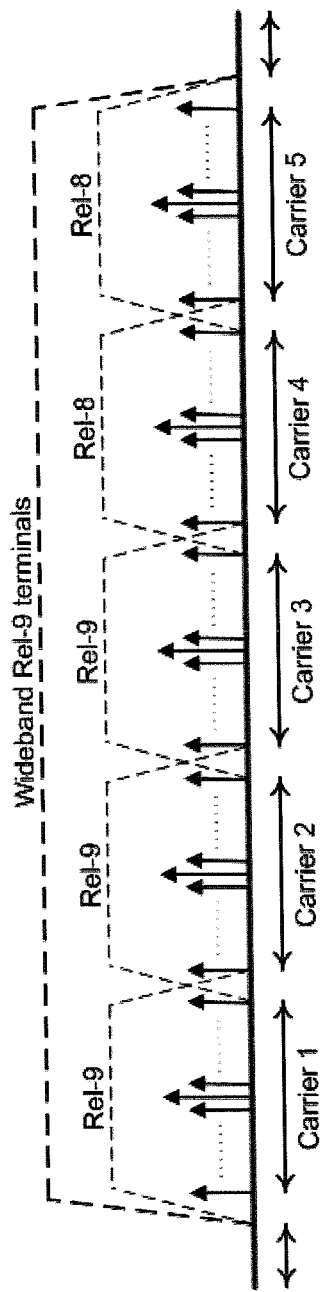
FIG. 2 is a schematic diagram showing five adjacent 20 MHz bandwidths that together make up a 100 MHz bandwidth for LTE-A.

In a second use case, there is improved ACK/NAK feedback capability in the case of TDD/CC aggregation. In Rel-8 LTE TDD, up to four ACK/NAK bits can be transmitted using PUCCH channel selection combined with ZAC sequence modulation, but note that this would require four PUCCH channels in Rel-8. This is not enough in certain LTE-Advanced deployment scenarios. For example, in LTE-Advanced (FDD/CC aggregation) there is a need to support up to five component carriers (see FIG. 2 for example). This will create a need to transmit five-bit ACK/NAK via five PUCCH channels. It is noted that the existing Rel-8 solution does not support such an extension. In LTE-Advanced TDD, there will be a need to support Nx5 ACK/NAK bits during a single subframe, where N corresponds to DL/UL ratio in the subframe. The above exemplary embodiments enable an increased ACK/NAK payload when using PUCCH Format 1a/1b resources. More than four ACK/NAK bits can be supported by combining the Rel-8 TDD PUCCH channel selection with the exemplary embodiments set forth above.

The inventors have conducted link level simulations to evaluate performance under the assumptions of 4 bits/subframe being transmitted, the available PUCCH resources were two Format 1b channels (R1 and R2), and the ratio of transmit to receive antennas was ½.

Further assumptions for four different schemes of the simulation that are compared below were as follows:

| Parameters | Assumptions |
|---|---|
| Numerology | 5 MHz per component carrier @ 2.0 GHz |
| Physical Resource Block (PRB) | 180 kHz (15 kHz × 12) |
| UE Velocity | 3 km/h |
| Channel Model | 3 GPP, Typical Urban |
| Number of Receive Antennas | 2 |
| Number of Transmit Antennas | 1 |
| Number of ACK/NAK Bits | 4 |
| Frame Structure | Normal CP |
| Delta_shift | 2 → 18 PUCCH Format 1a/1b channels/PRB |

Figure 5A:
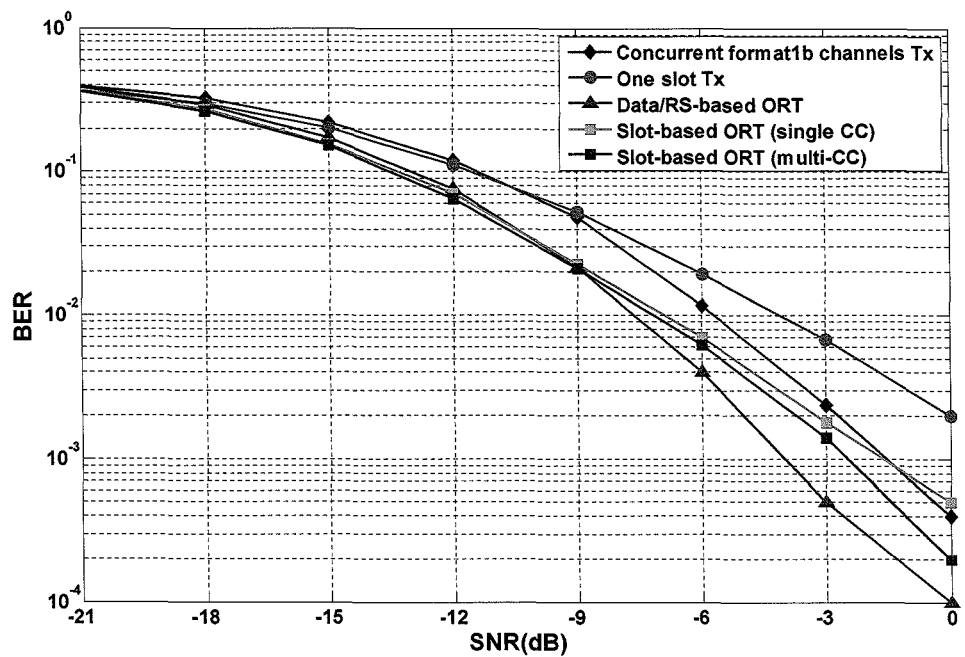
FIGS. 5A-5B plot performance of simulations comparing exemplary embodiments of the invention against other techniques for uplink control channels.
Figure 5B:
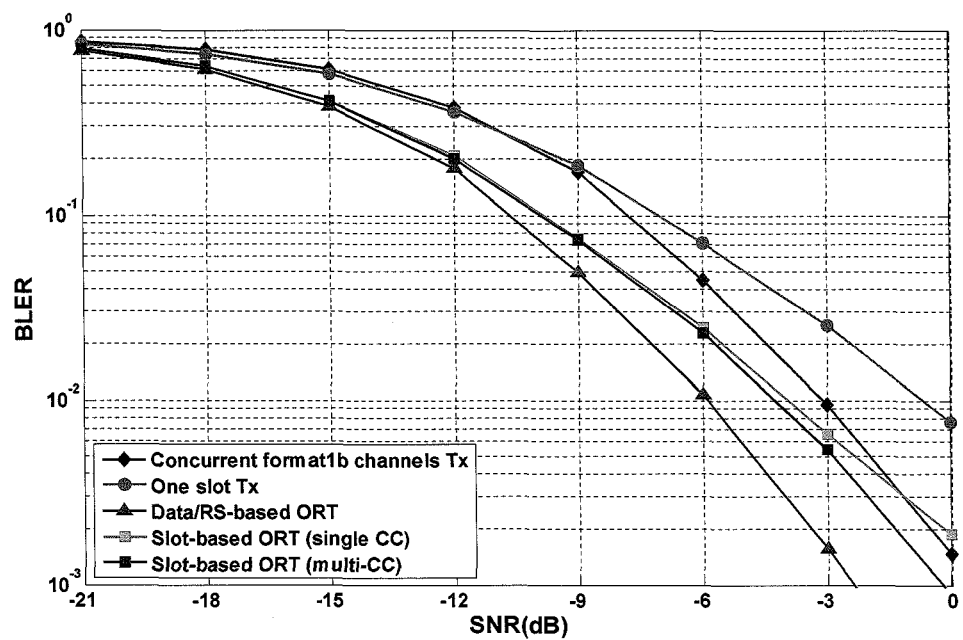

Scheme 1: Slot-based ORT (single CC and multi-CC cases):
  Available resources:
    R1 and R2 located in the same PRB/CC in single-CC case
    R1 and R2 located in different PRBs/CCs in multi-CC case
  R1 and R2 are selected based on two out of four input bits
    If two bits are (0,0): R1 is for slot 1 and slot 2;
    If two bits are (0,1): R1 is for slot 1, and R2 is for slot 2;
    If two bits are (1,0): R2 is for slot 1, and R1 is for slot 2;
    If two bits are (1,1): R2 is for slot 1 and slot 2.
  Two remaining bits are transmitted by means of QPSK-modulated zero auto-correlation ZAC sequence via the selected resource pair
  eNB performs blind detection to determine which channel pair is being used
  No power reduction at the transmitter side.
Scheme 2: Data/RS-based ORT
  Available resources:
    R1 and R2 locate in the same PRB/CC
  Resource selection conveying two out of four input bits is made separately for data and RS parts (see Table at FIG. 4A). Resource selection is maintained during the frequency hop.
  Two remaining bits are transmitted by means of QPSK-modulated ZAC sequence via the selected data/RS resource pair.
  eNB performs blind detection to determine which resources are being used for RS and data parts.
  No power reduction at Tx.
Scheme 3: Concurrent PUCCH format 1b channels Tx:
  Available resources:
    R1 and R2 locate in the same PRB/CC
  No resource selection, both resources convey two bits by means of QPSK-modulated ZAC sequence
  No blind channel detection at eNB side
  Increased cubic metric due to multi-sequence transmission. This coverage degradation has not been taken into account in the performance results.
  3-dB power reduction for each channel due to "power split" between two parallel channels
Scheme 4: One slot Tx (as set forth at document R1-081730 [3GPP TSG RAN WG1 #53, Kansas City, USA; May 5-9, 2008 by Samsung entitled "Increasing PUCCH Multiplexing Capacity", attached to the priority document as Exhibit D):
  Available resources:
    Only one resource (R1) occupied
  First two bits are transmitted during the first time slot (by means of QPSK-modulated ZAC sequence), another two bits are transmitted during the second time slot
  No blind detection at eNB side.
  No power reduction at Tx.
  Results are shown at FIG. 5A (bit error rate BER versus signal to noise ratio SNR) and at FIG. 5B (block error rate BLER versus SNR). The improvements of the exemplary embodiments of the invention plotted at scheme 2 over schemes 3 and 4 are obvious. Note also that schemes 1 and 2 can maintain the single-carrier property, which is not the case with scheme 3.

As noted above, implementations of the exemplary embodiments do not require multiple antennas at UE side, but when there is multiple antennas available, further gain can be achieved by combining the Data/RS-based ORT (intra-slot sub-channelization) or slot-based ORT (inter-slot sub-channelization) with transmit precoding/beamforming among the multiple transmission antennas.

As can be appreciated, the exemplary embodiments detailed above for multiple PUCCH transmission provide the following technical benefits:
  good performance with respect to existing schemes (e.g., scheme 1 above);
  single-carrier properties can be guaranteed with up-to four ACK/NAK bits via two concurrent PUCCH channels;
  CM increase due to concurrent PUCCH transmission is avoided;
  Coverage of PUCCH transmission is improved;
  It enables support for additional ACK/NAK/DTX states in LTE-Advanced via concurrent ACK/NAK channels: For FDD, nearly all ACK/NAK/DTX states could be supported. For TDD, more support for ACK/NAK/DTX feedback can be provided.
  It provides room for improving frequency diversity (in the case of multi-CC).
  No requirement on the number of transmission antennas at the UE side.
  It must also be considered that certain embodiments require that two PUCCH format 1a/1b resources are reserved. The Data/RS-based ORT requires that two occupied PUCCH resources are located in the same PRB, and the slot-based ORT requires certain coordination between the occupied PUCCH resources (in the case of single-CC), in order to guarantee that frequency diversity provided by slot-based frequency hopping is maintained. One example of this coordination is that the occupied PUCCH resources are allocated in such manner that both locate in odd or even PRBs.

Figure 6:
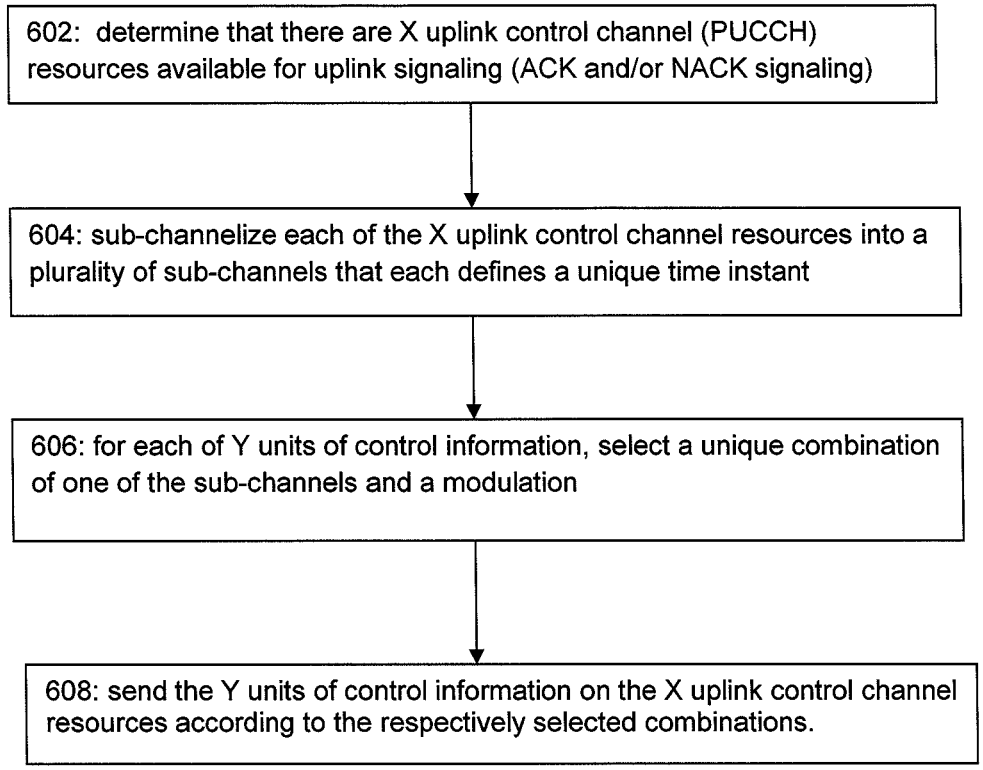
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram that illustrates the operation of a method, an apparatus such as a UE, and a result of execution of computer program instructions stored on a computer readable memory, in accordance with the exemplary embodiments of this invention. In accordance with these exemplary embodiments at block 602 it is determined that there are X uplink control channel resources available for uplink signaling. At block 604 each of the X uplink control channel resources is sub-channelized into a plurality of sub-channels that each defines a unique time instant or point in time. At block 606 there is selected for each of Y units of control information a unique combination of one of the sub-channels and a modulation, and at block 608 the Y units of control information are sent on the X uplink control channel resources according to the respectively selected combinations. In the above, X and Y are each integers greater than one.

(A) In accordance with an exemplary embodiment, the method, apparatus and computer program detailed at FIG. 6 is characterized in that the plurality of sub-channels comprise a data part and a reference signal part of an individual slot.

(B) In accordance with another exemplary embodiment, the method, apparatus and computer program detailed at FIG. 6 is characterized in that the plurality of sub-channels comprise different slots, and the slots are adjacent to one another.

(C) In accordance with an exemplary embodiment, the method, apparatus and computer program detailed at FIG. 6, optionally combined with either paragraph (A) or (B) above, in which the uplink control channel resources are PUCCH format 1a or 1b resources, and further wherein the number of sub-channels is equal to twice the number X of the plurality of available PUCCH resources. In a most particular embodiment, Y=2X.

(D) In accordance with an exemplary embodiment, the method, apparatus and computer program detailed at FIG. 6, optionally combined with either paragraph (A) or (B) above, in which the uplink signaling is ACK and/or NAK and/or DTX signaling, and each of the units of control information is one bit.

(E) In accordance with an exemplary embodiment, the method, apparatus and computer program detailed at FIG. 6, optionally combined with either paragraph (A) or (B) above, in which the modulation is determined by accessing a local memory using the available uplink resources (each modulation is associated in the memory with pairs/groups of uplink resources, as shown in the tables at FIGS. 4A-4B).

(F) In accordance with an exemplary embodiment, the method, apparatus and computer program detailed at FIG. 6, optionally combined with either paragraph (A) or (B) above, in which the method is executed by a UE, or the apparatus is the UE, or the computer program memory is stored within the UE. Specifically, such a UE in this embodiment is operating in a LTE-A system.

The various blocks shown in FIG. 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-A system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
   at least one processor; and
   at least one memory storing computer program instructions;
   in which the at least one memory, with the computer program instructions, is configured with the at least one processor to cause the apparatus at least to:
   determine that there are already assigned uplink control channel resources available for uplink signaling;
   sub-channelize each of the assigned uplink control channel resources into a plurality of sub-channels to support an increased number of bits on the assigned uplink control channel resources;
   select for each unit of control information a unique combination of at least one of the sub-channels and a modulation, in which the control information is at least one of acknowledge, negative acknowledge, and discontinuous transmission signaling; and
   send the control information according to the respectively selected combinations, in the assigned uplink control channel resources corresponding to at least one of physical uplink control channel format 1*a* and 1*b* resources.

2. The apparatus according to claim 1, in which the plurality of sub-channels comprise a data part and a reference signal part of an individual slot.

3. The apparatus according to claim 1, in which the plurality of sub-channels comprise different slots, and the slots are adjacent to one another.

4. The apparatus according to claim 1, in which the number of the plurality of sub-channels is equal to twice the number of the assigned uplink control channel resources.

5. The apparatus according to claim 4, in which the number of units of control information is equal to twice the number of the assigned uplink control channel resources.

6. The apparatus according to claim 1, in which each of the units of control information is one bit.

7. The apparatus according to claim 1, in which each modulation is associated in the at least one memory with pairs/groups of uplink resources, and the modulation is determined by accessing the at least one memory using the available uplink resources.

8. The apparatus according to claim 1, in which the apparatus comprises a user equipment operating in a long term evolution system.

9. The apparatus according to claim 1, in which the already assigned uplink control channel resources comprise at least one of existing data/reference signal division and physical uplink control channel resources.

10. A method comprising:
   determining that there are already assigned uplink control channel resources available for uplink signaling;
   sub-channelizing each of the assigned uplink control channel resources into a plurality of sub-channels to support an increased number of bits on the assigned uplink control channel resources;
   selecting for each unit of control information a unique combination of at least one of the sub-channels and a modulation, in which the control information is at least one of acknowledge, negative acknowledge, and discontinuous transmission signaling; and
   sending the control information according to the respectively selected combinations, in the assigned uplink control channel resources corresponding to at least one of physical uplink control channel format 1a and 1b resources.

11. The method according to claim 10, in which the plurality of sub-channels comprise a data part and a reference signal part of an individual slot.

12. The method according to claim 10, in which the plurality of sub-channels comprise different slots, and the slots are adjacent to one another.

13. The method according to claim 10, in which the number of the plurality of sub-channels is equal to twice the number of the assigned uplink control channel resources.

14. The method according to claim 13, in which the number of units of control information is equal to twice the number of the assigned uplink control channel resources.

15. The method according to claim 10, in which each of the units of control information is one bit.

16. The method according to claim 10, in which each modulation is associated in a computer readable memory with pairs/groups of uplink resources, and the modulation is determined by accessing the computer readable memory using the available uplink resources.

17. The method according to claim 10, executed by a user equipment operating in a long term evolution system.

18. A computer readable non-transitory memory storing computer program instructions which when executed by at least one processor result in actions comprising:
   determining that there are already assigned uplink control channel resources available for uplink signaling;
   sub-channelizing each of the assigned uplink control channel resources into a plurality of sub-channels to support an increased number of bits on the assigned uplink control channel resources;
   selecting for each unit of control information a unique combination of at least one of the sub-channels and a modulation, in which the control information is at least one of acknowledge, negative acknowledge, and discontinuous transmission signaling; and
   sending the control information according to the respectively selected combinations, in the assigned uplink control channel resources corresponding to at least one of physical uplink control channel format 1a and 1b resources.

19. The computer readable non-transitory memory according to claim 18, in which the plurality of sub-channels comprise a data part and a reference signal part of an individual slot.

20. The computer readable non-transitory memory according to claim 18, in which the plurality of sub-channels comprise different slots, and the slots are adjacent to one another.

21. The computer readable non-transitory memory according to claim 18, in which:
   the number o f the plurality of sub-channels is equal to twice the number of the assigned uplink control channel resources;
   and
   each of the units of control information is one bit.

* * * * *